US009952083B2

(12) United States Patent
Bartov et al.

(10) Patent No.: US 9,952,083 B2
(45) Date of Patent: Apr. 24, 2018

(54) MOVABLE SYSTEM FOR MEASURING A CONTENT OF A BIN

(71) Applicant: A.P.M. AUTOMATION SOLUTIONS LTD., Tel Aviv (IL)

(72) Inventors: Avishai Bartov, Hod-Hasharon (IL); Yossi Zlotnick, Ramat-Hasharon (IL)

(73) Assignee: APM AUTOMATION SOLUTIONS LTD, Tel Aviv (IL)

( * ) Notice: Subject to any disclaimer, the term of this patent is extended or adjusted under 35 U.S.C. 154(b) by 858 days.

(21) Appl. No.: 14/050,391

(22) Filed: Oct. 10, 2013

(65) Prior Publication Data
US 2015/0103628 A1 Apr. 16, 2015

(51) Int. Cl.
*G01S 15/00* (2006.01)
*G01F 23/296* (2006.01)

(52) U.S. Cl.
CPC .............. *G01F 23/2962* (2013.01)

(58) Field of Classification Search
CPC ...... B07C 5/3404; G01N 21/90; B67D 7/362; B67D 1/1238; B67D 3/0093; G01F 23/00
See application file for complete search history.

(56) References Cited

U.S. PATENT DOCUMENTS

| 4,387,373 A | * | 6/1983 | Longuemare, Jr. | G01S 13/9023 342/149 |
| 4,481,517 A | * | 11/1984 | Brown | G01J 9/02 342/201 |
| 5,131,271 A | * | 7/1992 | Haynes | G01F 23/2962 181/124 |

(Continued)

FOREIGN PATENT DOCUMENTS

| CA | 2759068 | | 2/2005 | |
| DE | 19860901 A1 | * | 7/2000 | ......... G01F 23/0076 |

(Continued)

OTHER PUBLICATIONS

Pallav, P., David A. Hutchins, and T. H. Gan. "Air-coupled ultrasonic evaluation of food materials." Ultrasonics 49.2 (2009): 244-253.*

(Continued)

*Primary Examiner* — Isam A Alsomiri
*Assistant Examiner* — Jonathan D Armstrong
(74) *Attorney, Agent, or Firm* — Reches Patents

(57) ABSTRACT

A method and a system for evaluating a content of a bin, the method may include (a) transmit multiple acoustic pulses by multiple acoustic transceiver arrays towards different areas of an upper surface of the content when the acoustic transceivers are positioned at different locations; wherein the multiple acoustic transceiver arrays are connected to a device that is moved according to a movement pattern between the different locations; receive by the multiple acoustic transceiver arrays multiple echoes of the multiple acoustic pulses; process by the multiple acoustic transceiver arrays the multiple echoes to provide multiple estimates of the different areas; associate with the multiple estimates of the different areas timing information indicative of a timing of the receiving of the multiple echoes to a computer; and obtain by an acoustic based location device, location information readings related to locations of the device at multiple points of time.

22 Claims, 10 Drawing Sheets

(56) References Cited

U.S. PATENT DOCUMENTS

| | | | | |
|---|---|---|---|---|
| 5,337,289 | A | * | 8/1994 | Fasching ............ G01F 23/2962 340/612 |
| 5,474,072 | A | * | 12/1995 | Shmulewitz ........... A61B 6/502 128/915 |
| 5,619,423 | A | * | 4/1997 | Scrantz ............ G01N 29/2412 324/220 |
| 6,055,214 | A | * | 4/2000 | Wilk ...................... G01S 7/521 367/99 |
| 6,282,526 | B1 | * | 8/2001 | Ganesh ................... G06N 7/02 342/13 |
| 6,581,459 | B1 | | 6/2003 | Lichtenfels, II |
| 6,634,234 | B1 | * | 10/2003 | Haas .................... G01F 23/284 367/138 |
| 6,986,294 | B2 | | 1/2006 | Fromme et al. |
| 6,987,707 | B2 | * | 1/2006 | Feintuch ................. G01S 15/04 367/87 |
| 8,040,272 | B1 | | 10/2011 | Clodfelter et al. |
| 8,611,187 | B2 | * | 12/2013 | Bis ......................... E21F 17/18 340/870.07 |
| 2004/0143176 | A1 | * | 7/2004 | Foxlin .................. G01C 21/165 600/395 |
| 2004/0173021 | A1 | | 9/2004 | Lizon |
| 2007/0159924 | A1 | * | 7/2007 | Vook ......................... G01S 5/28 367/127 |
| 2009/0007627 | A1 | * | 1/2009 | Perl ..................... G01F 23/2962 73/1.73 |
| 2012/0155584 | A1 | * | 6/2012 | Wilkinson ............... G04G 7/00 375/354 |
| 2012/0287749 | A1 | * | 11/2012 | Kutlik .................... G01H 3/125 367/7 |
| 2014/0207412 | A1 | | 7/2014 | Bartov |

FOREIGN PATENT DOCUMENTS

| | | | |
|---|---|---|---|
| DE | 10106176 | 8/2002 | |
| EP | 1853881 A4 * | 9/2009 | ......... G01F 23/2962 |
| IL | WO 2006090394 A2 * | 8/2006 | ......... G01F 23/2962 |
| IL | WO 2012160541 A2 * | 11/2012 | ........... A61B 8/4494 |
| IL | WO 2015052698 A1 * | 4/2015 | ........... G01F 23/296 |
| JP | S6022624 | 2/1985 | |
| JP | 2001330500 | 11/2001 | |
| JP | 2008304320 | 12/2008 | |
| KR | 20020016008 | 3/2002 | |
| WO | WO0160718 | 8/2001 | |
| WO | WO 0160718 A2 * | 8/2001 | ............ G01B 11/24 |
| WO | WO2007077079 | 7/2007 | |

OTHER PUBLICATIONS

Tamai, Yuki, et al. "Sound spot generation by 128-channel surrounded speaker array." Sensor Array and Multichannel Signal Processing Workshop Proceedings, 2004. IEEE, 2004.*

Gan, Tat Hean, Prakash Pallav, and David A. Hutchins. "Non-contact ultrasonic quality measurements of food products." Journal of Food Engineering 77.2 (2006): 239-247.*

Tumbo, S. D., et al. "Investigation of laser and ultrasonic ranging sensors for measurements of citrus canopy volume." Applied Engineering in Agriculture 18.3 (2002): 367.*

Sonbul, O., P. Popejoy, and A. N. Kalashnikov. "Ultrasonic sensor array for remote sensing of profiles of bulk materials." Instrumentation and Measurement Technology Conference (I2MTC), 2012 IEEE International. IEEE, 2012.*

Caicedo, David, and Ashish Pandharipande. "Distributed ultrasonic zoned presence sensing system." IEEE Sensors Journal 14.1 (2013): 234-243.*

Silva, Sérgio Rui, et al. "Synthetic Aperture Techniques for Sonar Systems." Advances in Sonar Technology (2009): 15-42.*

Durgin, Frank H., Krista Gigone, and Rebecca Scott. "Perception of visual speed while moving." Journal of Experimental Psychology: Human Perception and Performance 31.2 (2005): 339.*

Eshed Robotec. "V-scope in the Physics Laboratory". [https://web.archive.org/web/19970215011755/http://www.eshed.com/vlab.htm] [https://web.archive.org/web/19970215011743/http://www.eshed.com/v2.htm] [https://web.archive.org/web/19970215011723/http://www.eshed.com/v1.htm]. Feb. 15, 1997.*

Nakahira, K., et al. "The use of binary coded frequency shift keyed signals for multiple user sonar ranging." Networking, Sensing and Control, 2004 IEEE International Conference on. vol. 2. IEEE, 2004.*

Hernández, Alvaro, et al. "Ultrasonic ranging sensor using simultaneous emissions from different transducers." IEEE transactions on ultrasonics, ferroelectrics, and frequency control 51.12 (2004): 1660-1670.*

Terzic, Jenny, et al. Ultrasonic fluid quantity measurement in dynamic vehicular applications. Springer Science & Business Media, Jun. 14, 2013.*

Kirk, John C. "Motion compensation for synthetic aperture radar." IEEE Transactions on Aerospace and Electronic Systems 3 (1975): 338-348.*

Van Beek, A. M. 3D measurement systems for robot manipulators. Technical report, WFW 98.011, Eindhoven University of Technology, 1998.*

Vasudevan, Sud. Ultrasonic Digital Beamformation: A Comparative Study. vol. 14. Sep. 1998.*

Barshan, Billur, and Deniz Baskent. "Comparison of two methods of surface profile extraction from multiple ultrasonic range measurements." Measurement Science and Technology 11.6 (2000): 833.*

* cited by examiner

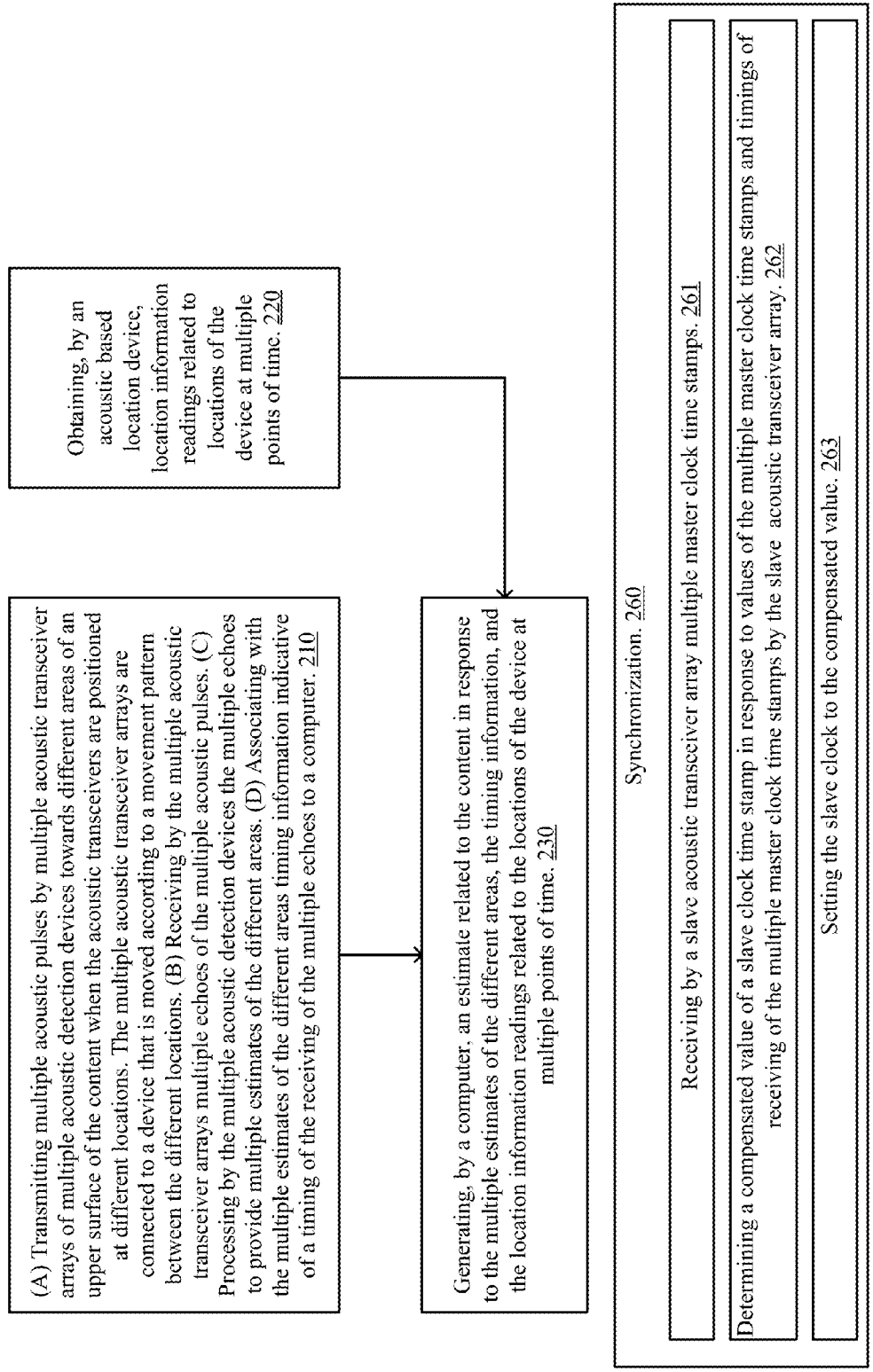

MOVABLE SYSTEM FOR MEASURING A CONTENT OF A BIN

BACKGROUND OF THE INVENTION

The monitoring of liquid inventory generally is straightforward. By contrast, the monitoring of bulk solid inventory that consists of particulates piled up inside a bin such as a silo often is very difficult. Examples of such bulk solid inventory include cement and sand for construction, grain, fertilizer, etc. The measurement of the level of bulk materials inside a bin is a problem that has not yet been solved adequately. The conditions inside bins typically are unfavorable (dust, extreme temperatures, etc.) and the contents of the bulk material stored in the bins often do not have a flat surface and are not always isotropic. Other difficulties arise from the wide variety of bin shapes in use and from the explosive atmospheres inside some bins.

The scope of the term "bin" as used herein includes any storage container, for bulk particulate solids, whose structure defines an interior volume for receiving and storing the solids. Such a bin may be closed above, below and on all sides, as is the case when the bin is a silo, a warehouse, a vessel or tank, or may be open above or on one or more sides. The example of a "bin" that is used in the detailed description of the present invention below is a silo; but it will be obvious to those skilled in the art how to apply the principles of the present invention to any type of bin.

Five principal methods are known for continuous measurement of the content of a bin such as a silo.

An electromechanical (yo-yo) level sensor consists essentially of a weight at one end of a reel of tape. The weight is allowed to descend in the silo to the depth at which the top surface of the content is situated. When the weight settles on top of the content, the tension in the tape slackens. The weight then is retracted to the top set point. The height of the content is inferred from the time required to retract the weight or from the measured tape length.

Mechanical devices such as yo-yo sensors are unreliable. They tend to get clogged by dust and to get stuck on obstacles such as pumps and rods inside the silos.

Ultrasonic level sensors work on the principle of ultrasonic sound wave transmission and reception. High frequency sound waves from a transmitter are reflected by the top surface of the content to a receiver. The height of the content is inferred from the round-trip travel time. Such sensors have limited range and work poorly in the presence of dust. In addition, such devices need to be custom-designed for different types of silo.

Radar level sensors work on the principle of electromagnetic wave transmission and reception. Electromagnetic waves from a transmitter are reflected by the top surface of the content to a receiver. The height of the content is inferred from the round-trip travel time. Such sensors have a very small point of measurement that is not suited for bulk solids. Even the Capacitance sensors measure the capacitance between two metallic rods or between a metallic rod and the ground. Because the silo content has a different dielectric constant than air, the capacitance changes according to the level of the top surface of the content between the two rods or between a rod and the ground. Such sensors tend to be inaccurate and are sensitive to humidity and to type of material stored in the silo.

All the prior art sensors discussed above are insensitive to the shape of the contents, and so are inaccurate in the presence of a common phenomenon called "coning" that occurs as bulk particulate solids are withdrawn via the base of a bin: an inverted conical hole, whose apex is directly above the point of withdrawal, tends to form in the bulk particulate solids. A similar phenomenon occurs as bulk particulate solids are added to a bin from the top: the solids tend to pile up in a cone whose apex is directly below the point of insertion of the solids. These sensors also work poorly in bins with complicated geometries and in the presence of obstacles.

A weight gauge measures the weight of a mobile silo and its content by measuring the tension in the rods that hold the silo. Installation of such gauges is complex, and they are suitable only for mobile silos with metallic legs.

Some bins are very large and the distance between the upper surface and the ceiling of the bin is too small that requires a very large number of devices in order to monitor the content.

There is thus a widely recognized need for, and it would be highly advantageous to have, a method of measuring the content of a bin especially when the bin is very large and the distance between the upper surface and the ceiling of the bin is small and would overcome the disadvantages of presently known methods as described above.

SUMMARY OF THE INVENTION

There are provided systems and methods for evaluating a content of a bin.

According to an embodiment of the invention there may be provided a method for evaluating a content of a bin, the method may include receiving, from a first acoustic detection device that may include a first acoustic transceiver array and by a computer, multiple first estimates of different first areas of an upper surface of the content, the first estimates are calculated by the first acoustic detection device by processing first echoes of acoustic pulses; wherein each first acoustic pulse has a shape of a lobe that is more that forty degrees wide; wherein the first echoes are received by the first acoustic transceiver array when the first acoustic transceiver was positioned at different first locations; receiving, by the computer and from an acoustic based location device, first location information indicative of a location of the different first locations; and generating, by the computer, an estimate related to the content in response to the multiple first estimates and to the first location information.

The distance between adjacent first locations may be at least ten times a distance between transducers of the first acoustic transceiver array.

Each first estimate is associated with a first acoustic transceiver array time stamp; wherein the first location information may include a mapping between locations of the first acoustic transceiver array and a master clock time stamps; and wherein the method may include calculating the first locations in response to the first acoustic time stamps, the mapping and a timing relationship between the first acoustic detection device clock and the master clock.

The method may include compensating for clock differences between first acoustic detection device clock and the master clock.

The compensating may include: receiving multiple master clock time stamps; determining a compensated value of a first acoustic detection device clock time stamp in response to values of the multiple master clock time stamps and timings of receiving of the multiple master clock time stamps; and setting the first acoustic detection device clock to the compensated value.

The method compensating may include calculating by the first acoustic detection device a gap between a rate of the first acoustic detection device clock and a rate of the master clock in response to the multiple master clock time stamps and in response to the timings of the receiving of the multiple master clock time stamps.

The acoustic based location device may include a first and second ranging acoustic transceiver arrays that face each other, wherein the first ranging acoustic transceiver array is static and the second ranging acoustic transceiver array follows a movement of the first acoustic transceiver array.

The acoustic based location device may include three ranging acoustic transceiver arrays that face each other, wherein at least one of the three ranging acoustic transceiver array is static and wherein at least another of the three ranging acoustic transceiver arrays follows a movement of the first acoustic transceiver array.

The upper surface of the content is expected to be located within a far field of each one of the acoustic transceiver arrays.

The method may include: transmitting, by the first acoustic transceiver array, the acoustic pulses; receiving, by the first acoustic transceiver array, the echoes of the acoustic pulses; and processing, by the first acoustic detection device, the echoes of the acoustic pulses to provide the first estimates.

The processing the first echoes of acoustic pulses may include utilizing a fuzzy logic engine.

The first acoustic transceiver array moves along a linear path at a constant velocity thereby passing through the different first locations.

The method may include receiving, from a second acoustic detection device that may include a second acoustic transceiver array, multiple second estimates of different second areas of the upper surface of the content, the second estimates are taken when the second acoustic transceiver is positioned at different second locations; wherein each second estimate is calculated by the second acoustic detection device by processing second echoes of acoustic pulses; wherein each second acoustic pulse has a shape of a lobe that is more that forty degrees wide; receiving, from the acoustic based location device, second location information indicative of a location of the different second locations; and generating, by the computer, the estimate related to the content in response to the multiple first estimates, the multiple second estimates, the first location information and the second location information.

The at least one first area partially overlaps at least one second area.

The method may include transmitting, by the first and second acoustic transceiver arrays, the acoustic pulses; receiving, by the first and second acoustic transceiver arrays, first and second echoes of the acoustic pulses; wherein at least one acoustic transceiver array of the first and second acoustic transceiver arrays receives echoes of acoustic pulses that were transmitted by another acoustic transceiver array of the first and second acoustic transceiver arrays; processing, by the first and second acoustic detection devices, the first and second echoes of the acoustic pulses to provide the first and second estimates.

The method may include transmitting by the first and second acoustic transceiver arrays, a plurality of acoustics pulses in an at least a partially overlapping manner towards an overlap area to generate an acoustic interference pattern that may include multiple fringes; detecting by at least one of the first and second acoustic transceiver arrays a fringe of the acoustic interference pattern and providing a fringe detection signal; and processing the fringe detection signal to assist in a provision of the estimate related to the content.

According to an embodiment of the invention there may be provided a method for evaluating a content of a bin, the method may include: transmitting multiple acoustic pulses by multiple acoustic transceiver arrays of multiple acoustic detection devices towards different areas of an upper surface of the content when the acoustic transceivers are positioned at different locations; wherein the multiple acoustic transceiver arrays are connected to a device that is moved according to a movement pattern between the different locations; receiving by the multiple acoustic transceiver arrays multiple echoes of the multiple acoustic pulses; processing by the multiple acoustic detection devices the multiple echoes to provide multiple estimates of the different areas; associating with the multiple estimates of the different areas timing information indicative of a timing of the receiving of the multiple echoes to a computer; and obtaining, by an acoustic based location device, location information readings related to locations of the device at multiple points of time.

The method may include generating, by a computer, an estimate related to the content in response to the multiple estimates of the different areas, the timing information, and the location information readings related to the locations of the device at multiple points of time.

The method may include determining locations of the multiple acoustic transceiver arrays when transmitting the multiple echoes by correlating between the timing information and the location information.

The distance between adjacent locations is at least ten times a distance between transducers of any acoustic transceiver array.

The method may include compensating for clock differences between clock s of the acoustic detection devices and a master clock.

The compensating may include: receiving multiple master clock time stamps; determining compensated values of acoustic detection device clock s time stamps in response to values of the multiple master clock time stamps and timings of receiving of the multiple master clock time stamps by the multiple acoustic detection devices; and setting the acoustic detection device clock s to the compensated values.

The compensating may include calculating by each acoustic detection device that uses the acoustic detection device clock a gap between a rate of the acoustic detection device clock and a rate of the master clock in response to the multiple master clock time stamps and in response to the timings of the receiving of the multiple master clock time stamps.

The acoustic based location device may include a first and a second ranging acoustic transceiver arrays that face each other, wherein the first ranging acoustic transceiver array is static and the second ranging acoustic transceiver array follows a movement of the first acoustic transceiver array.

The acoustic based location device may include three ranging acoustic transceiver arrays that face each other, wherein at least one of the three ranging acoustic transceiver array is static and wherein at least another of the three ranging acoustic transceiver arrays follows a movement of the first acoustic transceiver array.

The upper surface of the content is expected to be located within a far field of each one of the acoustic transceiver arrays.

The processing the multiple echoes may include utilizing fuzzy logic engines.

The device may move along a linear path at a constant velocity thereby passing through the different locations.

The at least two areas of the upper surface that are irradiated by acoustic pulses transmitted by different acoustic transceiver arrays partially overlap.

The at least one acoustic transceiver array of multiple acoustic transceiver arrays receives echoes of acoustic pulses that were transmitted by another acoustic transceiver array of the multiple acoustic transceiver arrays.

The method may include transmitting by at least two of the multiple acoustic transceiver arrays, a plurality of acoustics pulses in an at least a partially overlapping manner towards an overlap area to generate an acoustic interference pattern that may include multiple fringes; and detecting by at least one of the acoustic transceiver arrays a fringe of the acoustic interference pattern; providing a fringe detection signal; and processing the fringe detection signal to assist in a provision of the estimate related to the content.

According to an embodiment of the invention there may be provided a system that may include: a memory arranged to store: multiple first estimates of different first areas of an upper surface of the content, the first estimates are calculated by a first acoustic detection device that may include a first acoustic transceiver array by processing first echoes of acoustic pulses; wherein each first acoustic pulse has a shape of a lobe that is more that forty degrees wide; wherein the first echoes are received by the first acoustic transceiver array when the first acoustic transceiver was positioned at different first locations; first location information indicative of a location of the different first locations; and a computer that may be arranged to generate an estimate related to the content in response to the multiple first estimates and to the first location information.

The distance between adjacent first locations is at least ten times a distance between transducers of the first acoustic transceiver array.

According to an embodiment of the invention there may be provided a system that may include multiple acoustic detection devices and an acoustic based location device; wherein the multiple acoustic detection devices may include multiple acoustic transceiver arrays, wherein the multiple acoustic detection devices may be arranged to: transmit multiple acoustic pulses towards different areas of an upper surface of the content when the acoustic transceivers are positioned at different locations; wherein the multiple acoustic transceiver arrays are connected to a device that is moved according to a movement pattern between the different locations; receive multiple echoes of the multiple acoustic pulses; process the multiple echoes to provide multiple estimates of the different areas; associate with the multiple estimates of the different areas timing information indicative of a timing of the receiving of the multiple echoes to a computer; and wherein the acoustic based location device may be arranged to obtain location information readings related to locations of the device at multiple points of time.

The system may include a computer that may be arranged to generate an estimate related to the content in response to the multiple estimates of the different areas, the timing information, and the location information readings related to the locations of the device at multiple points of time.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 10 illustrates a method according to an embodiment of the invention.

Figure 1:
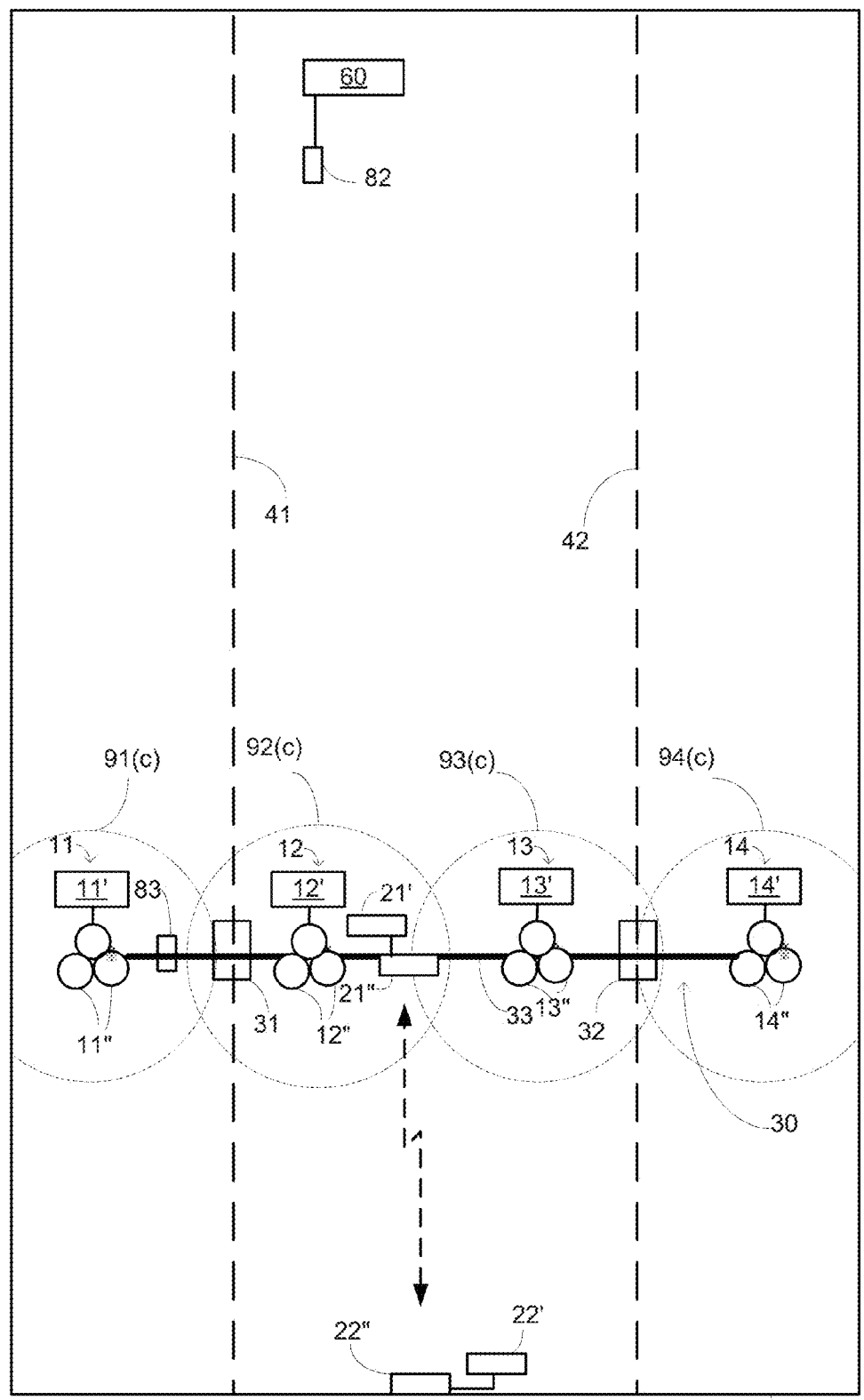
FIG. 1 is a top view a silo with a multiple acoustic detection devices mounted on a movable apparatus according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

The present invention is of a system for providing an estimate relating to the content stored in a bin. The estimate can relate to the quantity of the content, the distribution of the content within the bin and the like.

The principles and operation of content measuring according to the present invention may be better understood with reference to the drawings and the accompanying description.

The acoustic pulse can be directed towards a location in which there may be expected to be content at least at a certain fullness level of the bin. The change in the fullness level does not change the direction of illumination that may be fixed. Thus when the content level changes the direction of transmission does not change. In various figures it may be assumed that the acoustic pulse is directed at a certain direction that causes the acoustic pulse to be directed towards the upper surface of content of silo.

The system includes one or more acoustic transceiver arrays of one or more acoustic detection devices. The acoustic transceiver arrays may be move by an apparatus such as a cart or any other movable apparatus. The apparatus can move along linear rails or may move by any other mechanism that may include rails or be without rails. The movement can be done at a constant speed, can involve accelerations, decelerations, stops and the like. The apparatus can move along a liner path or a non-linear path. For simplicity of explanation the following examples will refer to a movement at a constant speed along linear rails that are parallel to a longitudinal axis of the silo.

The following figures illustrates systems with four or five number of acoustic detection devices but the number of acoustic detection devices may be any number that exceeds two. Furthermore, the figures illustrate the acoustic detection devices as being arranged along a line that is perpendicular to the longitudinal axis of the silo but any other formation of acoustic detection devices can be provided. For example the acoustic detection devices can be arranged in a staggered manner, in a symmetrical or a-symmetrical two dimensional or three dimensional array, and the like.

According to an embodiment of the invention the acoustic transceiver arrays of the acoustic detection devices are spaced apart in the sense that the distance between adjacent acoustic transceiver arrays is at least ten times a distance between transducers of the same acoustic transceiver array.

The spaced apart acoustic transducer arrays array cannot be regarded as forming a single phased array as they are too spaced apart from each other.

The content of the bin is expected to be within the far field of each of the acoustic transducer arrays.

The acoustic pulse can be directed towards a location in which there may be expected to be content at least at a certain fullness level of the bin. The change in the fullness level does not change the direction of illumination that may be fixed. Thus when the content level changes the direction of transmission does not change. In various figures it may be assumed that the acoustic pulse is directed at a certain direction that causes the acoustic pulse to be directed towards the upper surface of content of the silo.

Figure 2:
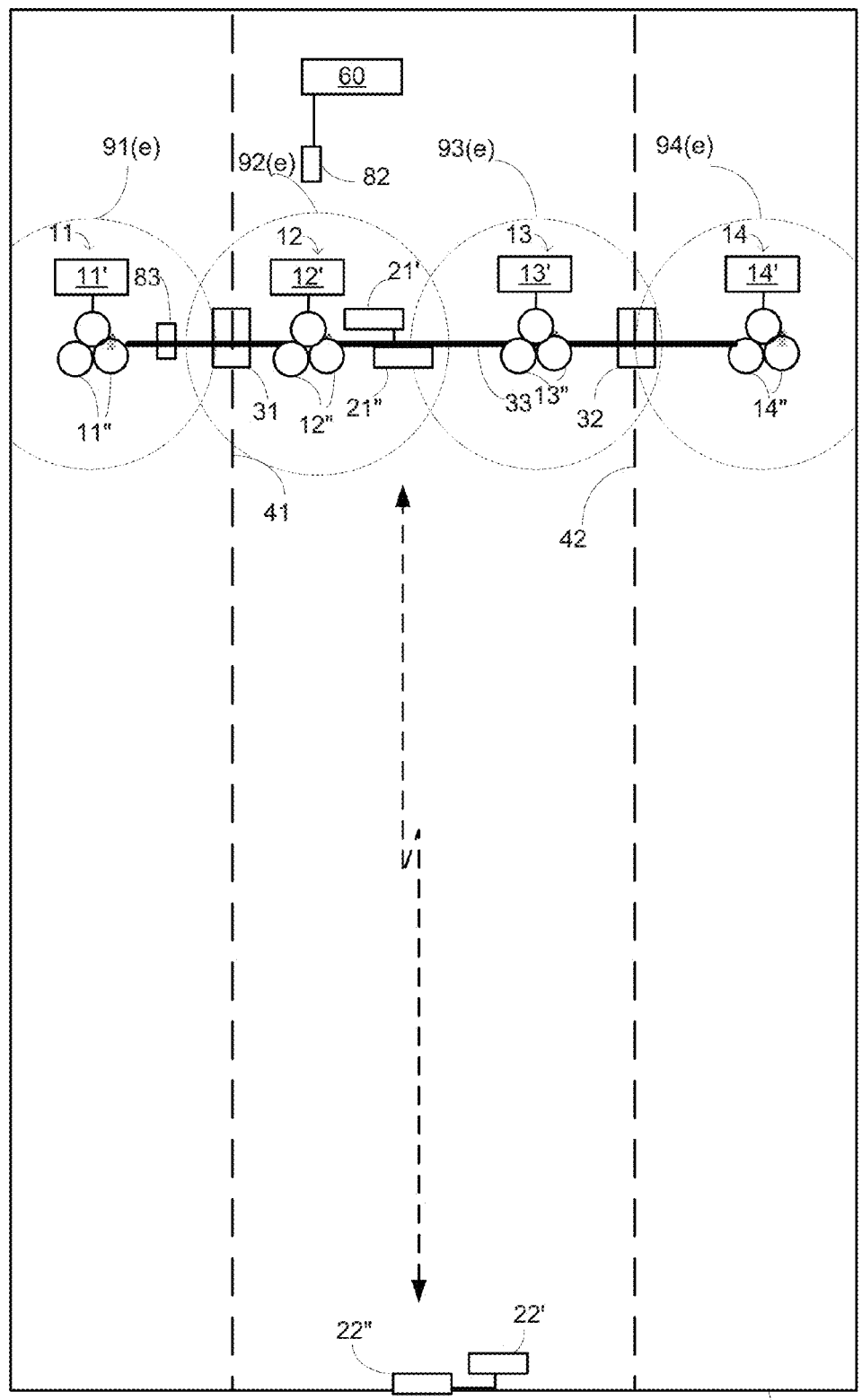
FIG. 2 is a top view a silo with a multiple acoustic detection devices mounted on a movable apparatus according to an embodiment of the invention.
Figure 3:
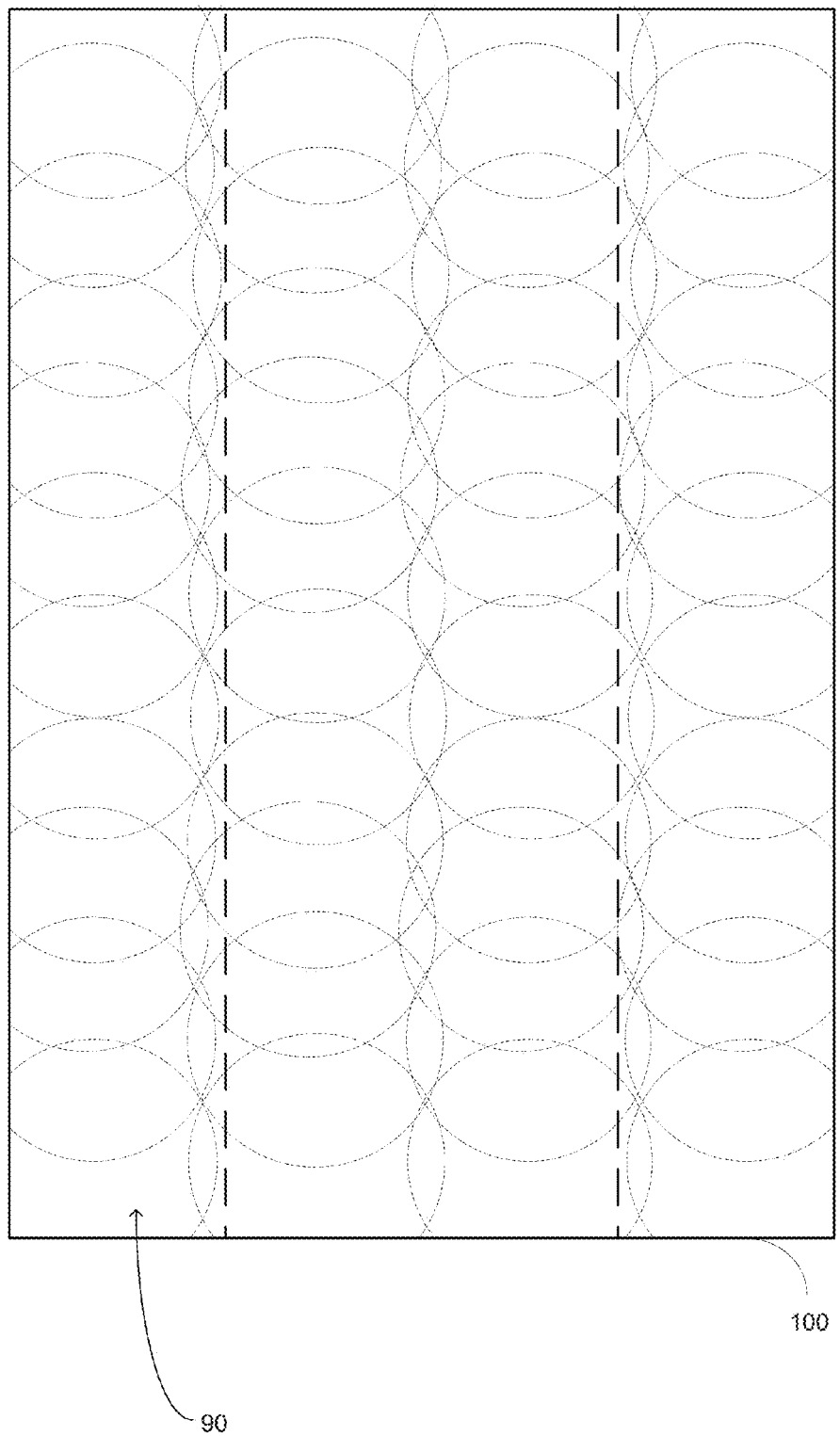
FIG. 3 illustrates multiple illuminates areas of content of the bin at different point of time by a system that includes four acoustic detection devices according to an embodiment of the invention.
Figure 8:
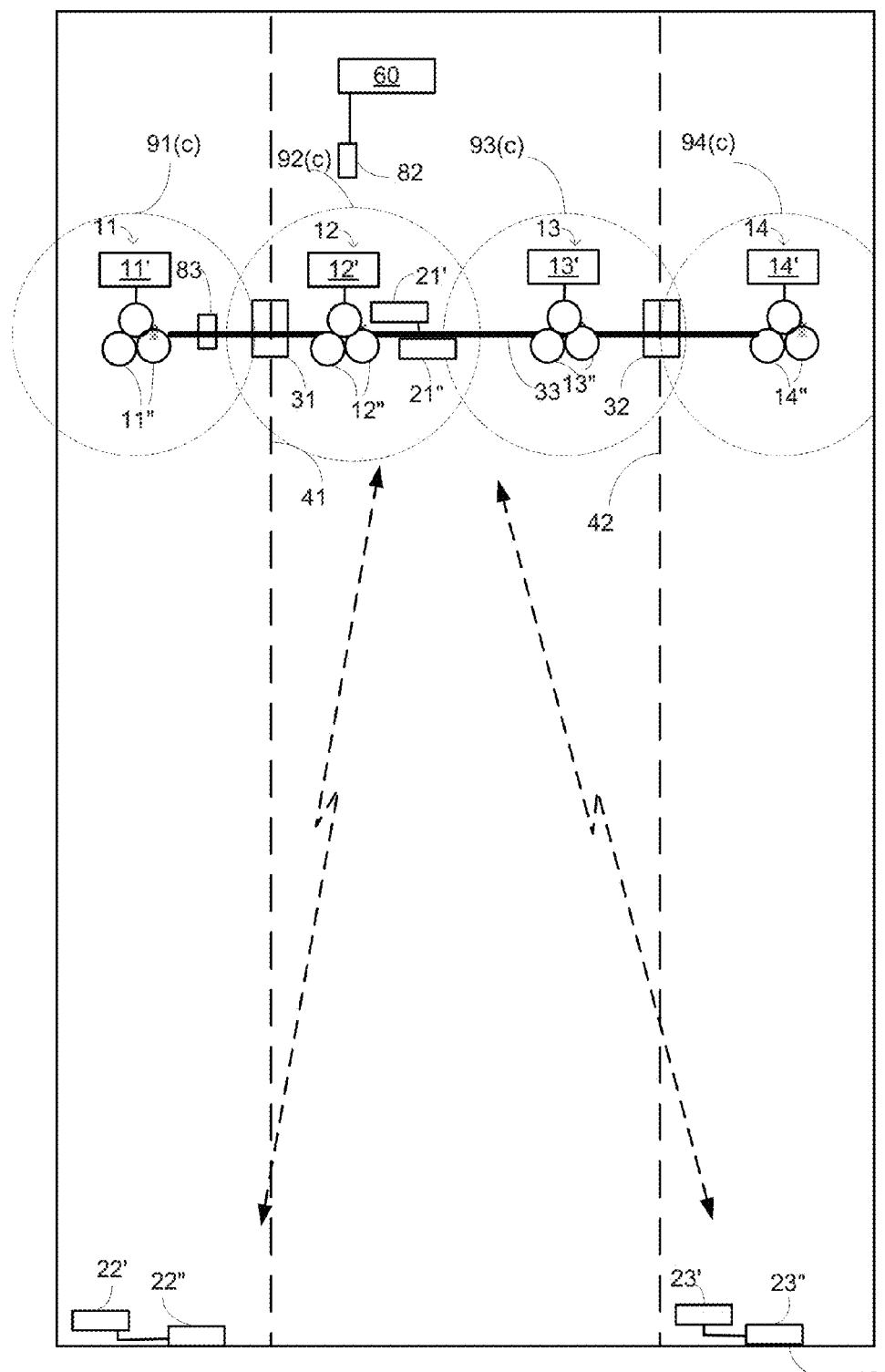
FIG. 8 is a top view a silo with a multiple acoustic detection devices mounted on a movable apparatus according to an embodiment of the invention.
Figure 9:
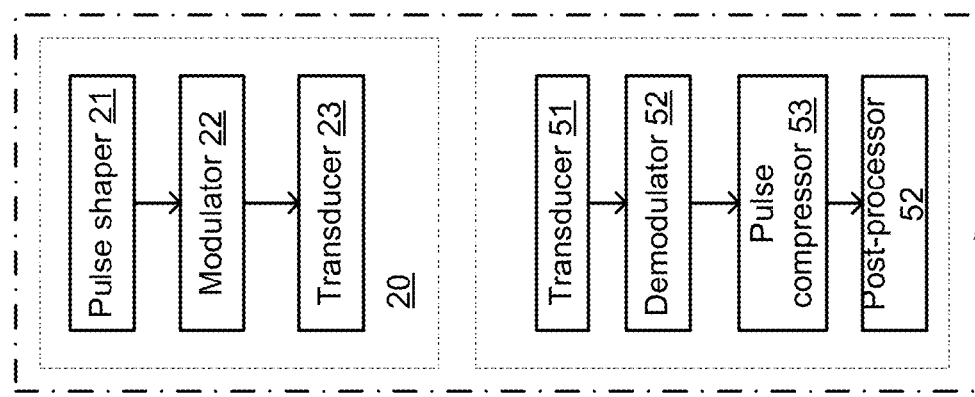
FIG. 9 illustrates a prior art acoustic transceiver.

Furthermore—although FIGS. 1, 2 and 8 illustrate that each acoustic transceiver includes three acoustic transducers, it is noted that one or more acoustic transceiver may include another number of acoustic transceivers. The different acoustic transceiver arrays may have the same number of acoustic transceivers or may differ from each other by the number of acoustic transceivers. A non-limiting example of such acoustic transceiver arrays is illustrated in U.S. Pat. No. 8,091,421 which is incorporated herein by reference.

Additionally or alternatively, one or more acoustic transceivers may include the same acoustic transducers or may differ from each other by the size and/or shape of the acoustic transducers.

Additionally or alternatively, one or more acoustic transceivers may have the same radiation patterns or differ from each other by their radiation patterns.

Figure 5:
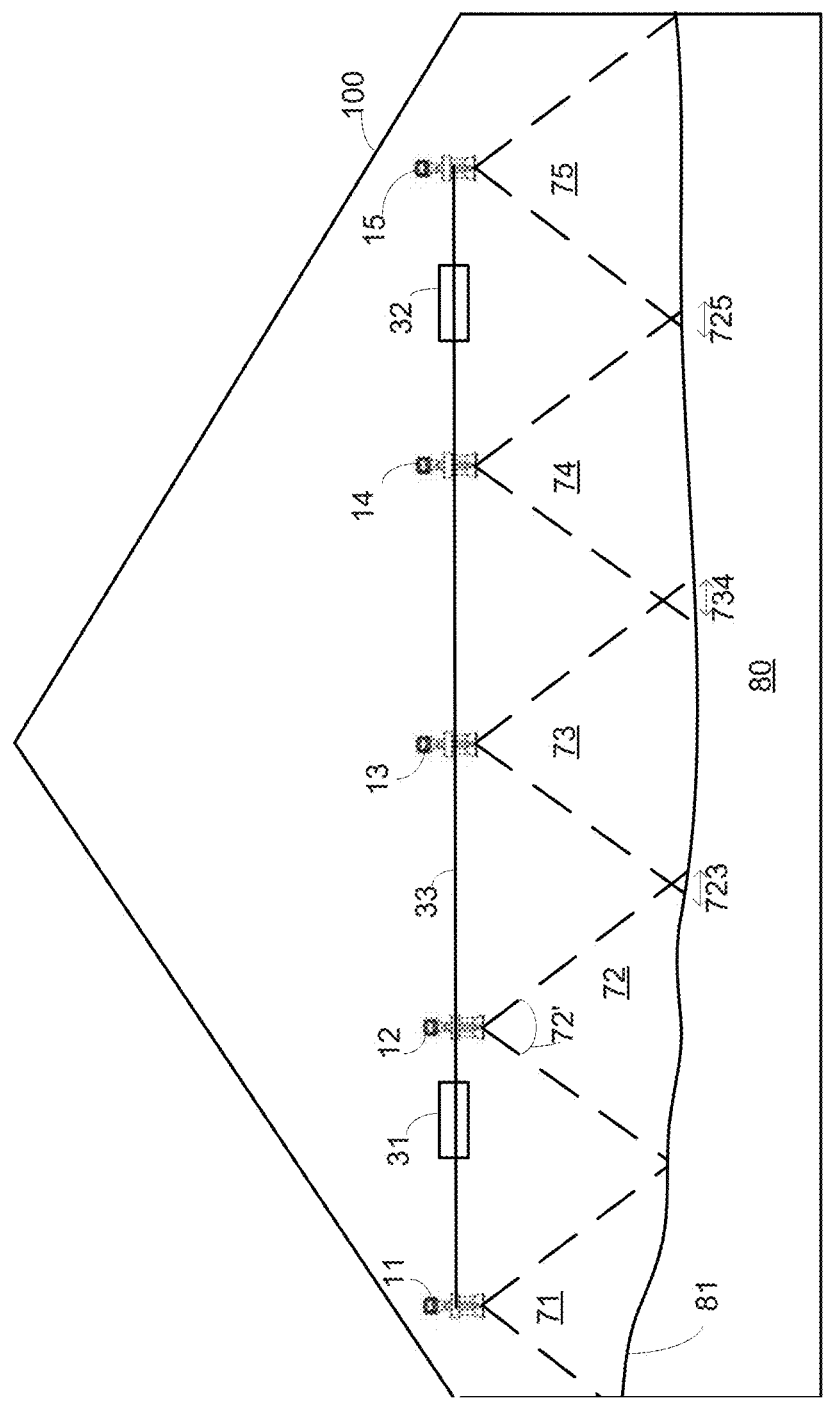
FIG. 5 is a cross sectional view a silo with a multiple acoustic detection devices mounted on a movable apparatus according to an embodiment of the invention.

The fields of view of the different spaced apart acoustic transducer may not overlap or may overlap. FIG. 5 illustrates five fields of view 71, 72, 73, 74 and 75 of five acoustic detection systems 11, 12, 13, 14 and 15 respectively that only slightly overlap—as illustrated by small overlap area 723 between fields of view 72 and 73, small overlap area 734 between fields of view 73 and 74 and small overlap area 745 between fields of view 74 and 75. The size of overlap areas may change with a change in the location and shape of the upper surface of content 80. Lower levels of content reduce the size of the overlap areas. FIG. 5 also illustrates the fields of views (width of reception field of view and width of acoustic pulse) is large—may exceed forty, fifty, sixty, seventy and even more degrees—as illustrated by angle 72' of field of view 72. Such wide fields of view dramatically decreases the number of acoustic detection devices in comparison to much narrower field of view devices such as radar or ultrasonic devices.

It is noted that due to the overlapping areas an acoustic transceiver array can receive echoes of acoustic pulses transmitted by itself and echoes of acoustic pulses transmitted by other acoustic transceiver arrays.

Figure 6:
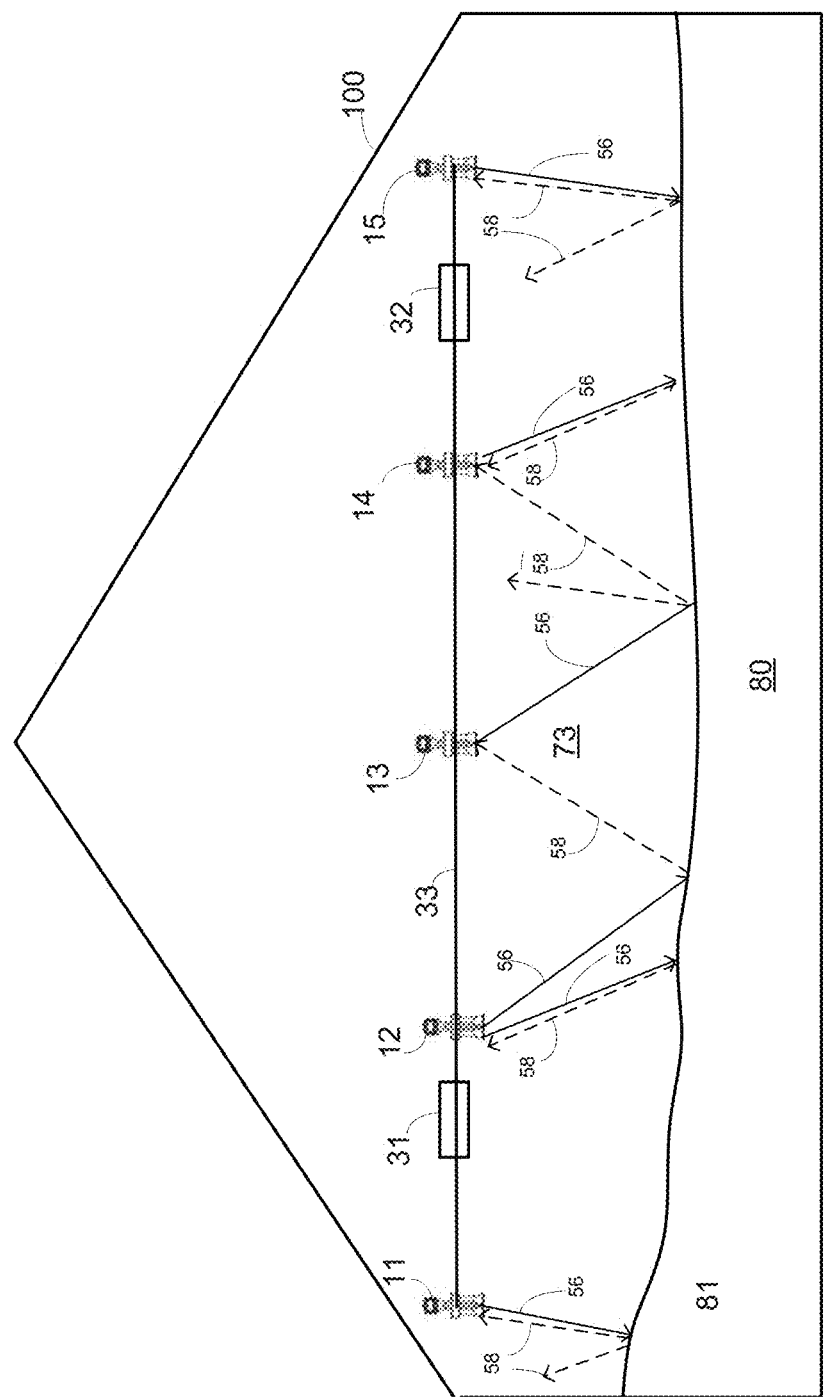
FIG. 6 is a cross sectional view a silo with a multiple acoustic detection devices mounted on a movable apparatus according to an embodiment of the invention.
Figure 7:
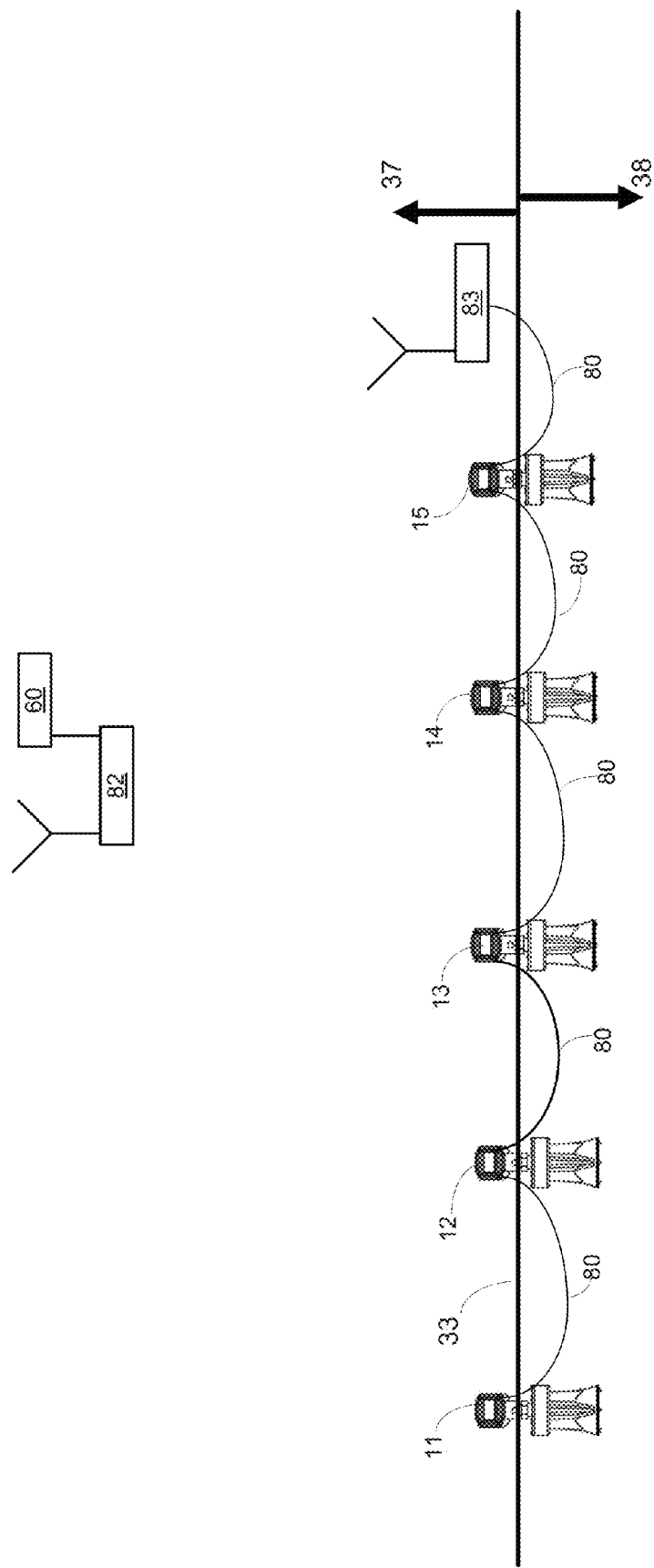
FIG. 7 illustrates a communication line, five acoustic detection devices and wireless communication link with a computer according to an embodiment of the invention.

FIG. 6 represents acoustic pulses by arrows 56 (although these acoustic pulses are much wider) and echoes (some are receives by acoustic transceiver arrays and some are not received) by arrows 58. Echoes 58 of acoustic pulses 56 transmitted by acoustic transceiver arrays of acoustic detection devices 11, 12, 14, and 15 are illustrates as being received by the same acoustic transceiver arrays that transmitted them. In addition overlap areas 723 and 734 allow acoustic transceiver arrays of acoustic detection devices 13 and 14 to receive echoes 58 of acoustic pulses 56 transmitted by acoustic transceiver arrays of acoustic detection devices 12 and 13.

FIGS. 1 and 2 are top views a silo 100 with a multiple acoustic detection devices 11-14 mounted on a movable apparatus 30 positioned at two different locations according to an embodiment of the invention.

The field of views of the four acoustic detection devices 11-14 at a first point of time (FIG. 1) are denoted 91(c), 92(c), 93(c) and 94(c) respectively. The field of views of the four acoustic detection devices 11-14 at a second point of time (FIG. 2) are denoted 91(e), 92(e), 93(e) and 94(d) respectively.

Figure 4:
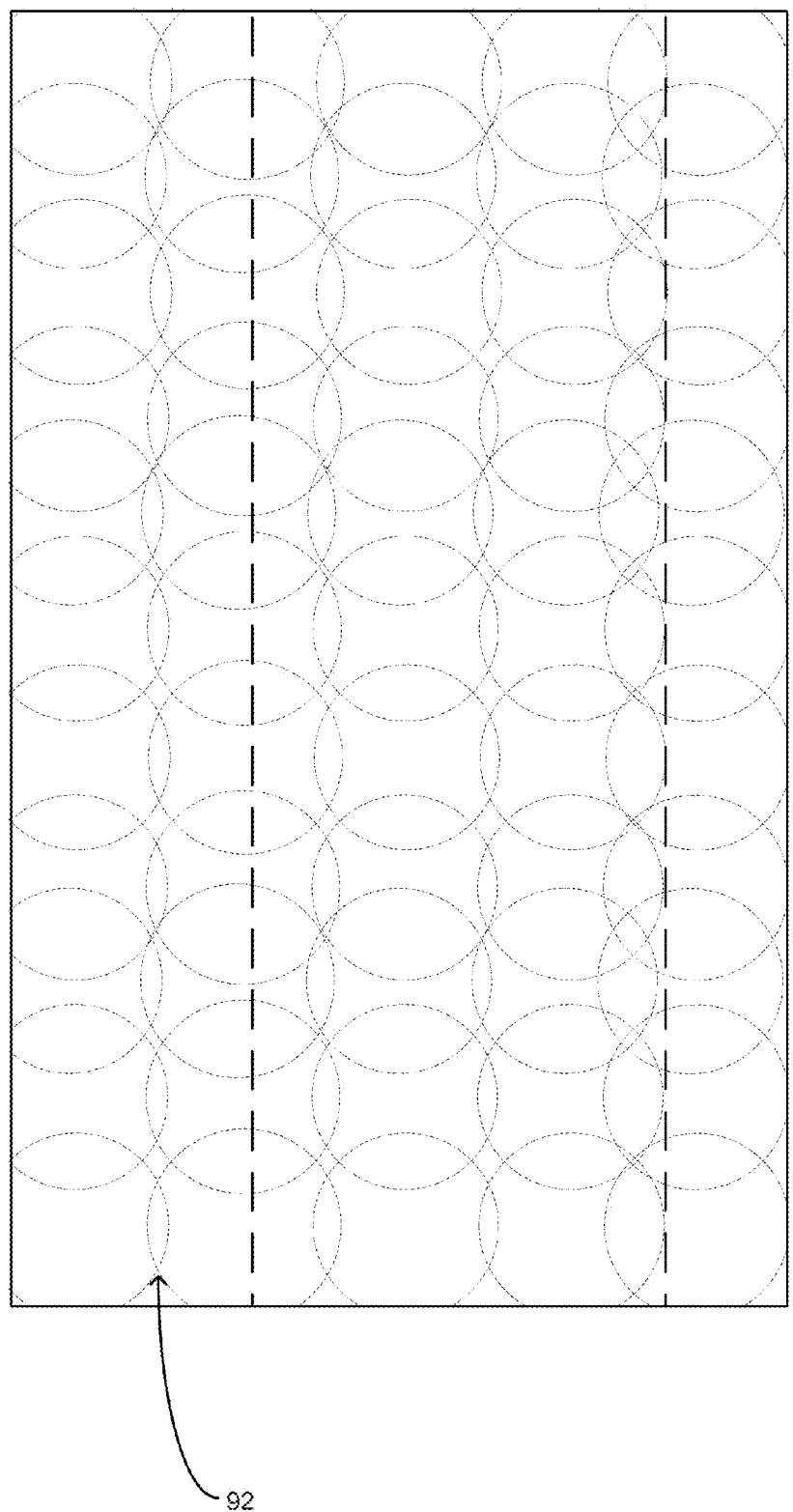
FIG. 4 illustrates multiple illuminates areas of content of the bin at different point of time by a system that includes five acoustic detection devices according to an embodiment of the invention.

Apparatus 30 includes wheels 31 and 32 (or other rail interfacing elements) that move along tracks 41 and 42 and a structural element such as bar 33 (or a wagon). The four acoustic detection devices 11-14 are connected to the apparatus and follow its movements and thus can scan multiple areas (denoted 90 in FIGS. 2 and 92 in FIG. 4) of the upper surface of the content. These areas are defined by the fields of view of the four acoustic detection devices 11-14 and by the shape and location of the upper surface of content (denoted 80 in FIG. 5). Larger areas can be covered when there are fewer content in the bin.

FIGS. 1 and 2 also illustrate an acoustic based location device that includes first and a second ranging acoustic transceiver arrays 21" and 22" and processors 21' and 22'. The first and second ranging acoustic transceiver arrays 21" and 22" face each other wherein the first ranging acoustic transceiver array 22" is static. The first and second ranging acoustic transceiver arrays 21" and 22" are normal to the plane of FIG. 1. The second ranging acoustic transceiver array 21" follows a movement of the multiple acoustic transceiver arrays. The distance can be calculated by measuring the propagation period of an acoustic pulse between the first and second ranging acoustic transceiver arrays. Each ranging acoustic transceiver array can use different transmission frequencies than those used by the acoustic transceiver arrays of the detection devices (11-14). Additionally or alternatively, the transmissions of the ranging acoustic transceiver arrays can be done in time windows when the acoustic transceiver arrays of the detection devices (11-14) do not transmit.

FIG. 8 illustrates an acoustic based location device that includes first, second and third ranging acoustic transceiver arrays 21", 22" and 23" and first, second and third processors 21', 22' and 23' connected to these arrays. The first, second and third ranging acoustic transceiver arrays face each other. The first, second and third ranging acoustic transceiver arrays 21", 22" and 23" are normal to the plane of FIG. 8. The second and third ranging acoustic transceiver arrays 22" and 23" are spaced apart from each other and are static. The first ranging acoustic transceiver array 21" follows a movement of the multiple acoustic transceiver arrays.

Referring back to FIGS. 1 and 2, each detection system has a processor and an array of acoustic transducers. Detection system 11 includes processor 11' and an acoustic transducer array that includes three acoustic transducers 11".

Detection system 12 includes processor 12' and an acoustic transducer array that includes three acoustic transducers 12". Detection system 13 includes processor 13' and an acoustic transducer array that includes three acoustic transducers 13". Detection system 14 includes processor 14' and an acoustic transducer array that includes three acoustic transducers 14".

The processors 11', 12', 13' and 14' may be electrically connected to their corresponding acoustic transducer arrays and/or to each other via wire or via a wireless manner. The locations of the processors in relation to each other can be regarded as being less significant that the spatial relationship between the spaced apart acoustic transducer arrays. Therefore, and for brevity of explanation, the following text may refer to the locations of the acoustic transducer arrays and not to the locations of the detection systems.

The different processors (11', 12', 13' and 14') can be coupled to each other in a wired or wireless manner. They can be coupled to another entity such as a computer (Server) 60 by wire or in a wireless manner. FIGS. 1, 2 and 8 illustrate wireless communication devices 83 and 82 that wirelessly communicate with each other. Wireless communication device 82 is coupled to computer 60 and wireless communication device 83 is connected to the processors. FIG. 8 illustrates a communication wire 80 that serially connects acoustic detection devices 11-15 to each other and to wireless communication device 83.

The computer 20 may control the transmission and/or reception windows of the different acoustic transceiver arrays. Additionally or alternatively, one or more of the acoustic detection devices can control the timing of transmissions and/or reception windows.

Each acoustic transceiver of each array includes a transmitter and a receiver. FIG. 8 illustrates acoustic transceiver 11 as including receiver 50 and transmitter 40.

The transmitter 50 may be arranged to transmit pulses of acoustic energy that may might be wide enough to cover, without scanning relatively large areas of the upper surface of the content—in comparison to much narrower areas that can be covered by narrow cross section radio frequency or narrow cross section (aperture of about 10 degrees) ultrasonic waves.

The pulses of acoustic energy can have a frequency between 2-7 KHertz.

It is noted that the number of transceiver arrays can differ from three and that radio frequency and ultrasonic radiation can be used.

Each acoustic transceiver array 70 may include a transmission path and a reception path. The transmission path (transmitter—denoted 40) may include a pulse shaper 41, a modulator 42 and a transducer (speaker) 43 while the reception path (receiver—denoted 50) can include a transducer (microphone) 51, a demodulator 52, a pulse compressor 53 and a post processor 54 such as those illustrated in US patent application titled "Variable length ranging and direction-finding signals constructed from beamlimited kernals and sparse spreading sequences", having a Ser. No. 13/041, 461 filing date Mar. 7, 2011 which is incorporated herein by reference. The output of the post-processors of each of the transceivers can be provided to a processor (11', 12', 13' and 14') for further processing—for example for more accurate angle of reception analysis, more accurate estimates and the like).

Pulse shaper 41 generates a baseband pulse from a kernel. Modulator 42 modulates a carrier wave with the baseband pulse. Transducer 43 launches modulated carrier wave, into a medium that supports propagation of the carrier wave, as a transmitted acoustic pulse 56, towards the upper surface of the content.

An echo from a non-overlapping illumination area or a fringe (or an echo) of an interference patterns formed in overlap areas (in case of partially overlapping transmission) may be detected by each acoustic transceiver array.

Demodulator 52 demodulates the echo and/or fringe to provide a received representation of the baseband pulse.

Pulse compressor 53 compresses the representation of the baseband pulse by de-convolution. The pulse compression provides a compressed pulse that is a time-shifted representation of the original kernel. Post-processor 54 applies post-processing the compressed pulse and infers the range to multiple points of the upper surface as one-half of the product of the round-trip travel time of acoustic pulse 56 and echo 58.

According to another embodiment of the invention the processing is only partially done by the acoustic detection devices and it is at least partially done by computer 60. Computer 60 can merge information received from different acoustic detection devices 11-14 to provide a better estimate of the content of the bin.

The directional information is obtaining by using different combinations of acoustic transceiver arrays to transmit acoustic pulses and receive echoes and/or fringes.

The following method describes sequences that includes a transmission of an acoustic pulse by one or more acoustic transceiver array and a reception (or at least an attempt of reception) of echoes of that acoustic pulse. It is expected that multiple echoes are received. The processing of the echoes can provide an estimate relating to the content of the bin. This estimate can be an estimate of a certain area or point of the upper surface of the content of the bin, can be an estimate of a presence of an obstacle, can be an estimate of multiple areas and/or multiple points of the upper surface of the bin, a mapping of the upper surface of the bin and even the volume of the content. Typically the estimate of the content of the bin requires multiple transmissions of multiple acoustic pulses over time. The estimates can be provided by each acoustic detection device, by collaboration between multiple acoustic detection devices, by a controller (or any other entity) that receives initial estimates from one or more acoustic detection devices, by collaboration between such a controller and one or more acoustic detection devices.

The following text refers to multiple estimates. These estimates can stand alone, be merged or otherwise further processed to provide a final estimate. A stage of processing an echo may include (a) determining characteristics of the echo (such as degree of arrival, signal to noise ratio, amplitude), (b) determining a location of a reflecting point or area of the surface that reflected the echo, (c) evaluating a reliability level of the estimation of the location of the reflecting point or area, (d) estimating a shape of the content. Each one of the determinations (a)-(d) or any other type of determination can be regarded as an estimate relating to the content.

The determination of a location of a reflecting point that belongs to the upper content of the surface and was reflected an acoustic pulse transmitted from a first acoustic transceiver array and received by a second acoustic transceiver arrays can be based upon geometrical relationships and is determined in response to (a) spatial relationship between the first and second acoustic transceiver arrays, to (ii) a time gap between a transmission of the first acoustic pulse and the reception of the echo of the first acoustic transceiver array, and to (iii) a direction (ALPHA) of arrival of the echo to the second acoustic transceiver array. Assuming that the first and second acoustic transceiver arrays and the reflecting points are virtually linked by an imaginary triangle than the first edge E1 virtually links between the first and second acoustic transceiver arrays, the sum (Es) of lengths of the second and third edges E2 and E2 virtually linking the second and first acoustic transceiver arrays to the reflecting point is represented by the time gap (time gap=(E2+E3)/V), wherein V is the propagation velocity of acoustic signals in air, and the angle between E1 and E2 is provided the direction of arrival of the echo.

The relationships between E1, E2, E3 and ALPHA can be given by the following equation, based upon the relationship between angles and edges of the virtual triangle:

$$E3^2 = E2^2 - E1^2 + 2*E1*E2*\text{Cosine}(\text{ALPHA})$$

As Es, ALPHA and E1 are known, E3 (the distance between the second transceiver array and the reflecting point) can be extracted:

$$E3^2 = (Es-E3)^2 - E1^2 + 2*E1*(Es-E3)*\text{Cosine}(\text{ALPHA})$$

FIG. 8 illustrates method 200 according to an embodiment of the invention.

Method 200 starts by stages 210 and 220.

Stage 210 may include (a) transmitting multiple acoustic pulses by multiple acoustic transceiver arrays of multiple acoustic detection devices towards different areas of an upper surface of the content when the acoustic transceivers are positioned at different locations. The multiple acoustic transceiver arrays are connected to a device that is moved according to a movement pattern between the different locations, (b) receiving by the multiple acoustic transceiver arrays multiple echoes of the multiple acoustic pulses; (c) processing by the multiple acoustic detection devices the multiple echoes to provide multiple estimates of the different areas; and (d) associating with the multiple estimates of the different areas timing information indicative of a timing of the receiving of the multiple echoes to a computer.

Stage 210 may include applying fuzzy logic.

Stage 220 may include obtaining, by an acoustic based location device, location information readings related to locations of the device at multiple points of time.

Stages 210 and 220 may be followed by stage 230 of generating, by a computer, an estimate related to the content in response to the multiple estimates of the different areas, the timing information, and the location information readings related to the locations of the device at multiple points of time.

Stage 230 may include determining locations of the multiple acoustic transceiver arrays when transmitting the multiple echoes by correlating between the timing information and the location information.

The distance between adjacent locations may be at least ten times a distance between transducers of any acoustic transceiver array.

The acoustic based location device may include a first and a second ranging acoustic transceiver arrays that face each other wherein the first ranging acoustic transceiver array is static and the second ranging acoustic transceiver array follows a movement of the multiple acoustic transceiver arrays. The distance can be calculated by measuring the propagation period of an acoustic pulse between the first and second ranging acoustic transceiver arrays.

Stage 230 may include synchronizing between the clocks of the first and second ranging acoustic transceiver arrays and the transmission time of the acoustic pulse (by the first ranging acoustic transceiver array) can be known to the second ranging acoustic transceiver array. The transmission time can be included in a time stamp embedded in the acoustic pulse, it can be determined in advance and the like.

Alternatively, a third entity can be fed by the transmission and reception times and calculates the propagation time and hence the distance between the first and second ranging acoustic transceiver arrays.

Additionally or alternatively, it is assumed that there is a known delay (DELAY) between (i) a reception (by the second ranging acoustic transceiver array) of a first acoustic pulse (transmitted by the first ranging acoustic transceiver array) and (ii) a transmission of a second acoustic pulse by the second ranging acoustic transceiver array and in response to the reception of the first acoustic pulse. In this case twice the distance (DISTANCE) between the difference between first and second ranging second ranging acoustic transceiver array can be calculated (during stage 230) by:
  a. Calculating a time gap (TGAP) between a time (T2) of reception of the second acoustic pulse by the first ranging second ranging acoustic transceiver array and a time (T1) of transmission of the first acoustic pulse.
  b. Subtracting from TGAP the DELAY to provide a propagation period (PP).
  c. Multiplying the propagation period (PP) by half of a velocity (V) of propagation of acoustic pulses to provide the distance.

In other words DISTANCE=(T2−T1−DELAY)/2V.

This calculation can be made by the first or second ranging acoustic transceiver arrays or by another entity such as the computer.

The calculation of the DISTANCE can be done by transmitting an acoustic pulse from the second ranging acoustic transceiver array to the first ranging acoustic transceiver array and sending a response acoustic pulse from the first ranging acoustic transceiver array to the second ranging acoustic transceiver array.

During the execution of stage 230 the first and second ranging acoustic transceiver arrays may use are relatively large beams—that allows performing distance calculation even when these first and second ranging acoustic transceiver array do not exactly face each other.

Alternatively, the acoustic based location device may include three or more ranging acoustic transceiver arrays that face each other. At least one of the three ranging acoustic transceiver array is static and wherein at least another of the three ranging acoustic transceiver arrays follows a movement of the first acoustic transceiver array. Such a system can locate the locations of the multiple acoustic transceiver arrays by triangulation.

The upper surface of the content can be expected to be located within a far field of each one of the acoustic transceiver arrays.

During the execution of stage 210 at least two areas of the upper surface that are irradiated by acoustic pulses transmitted by different acoustic transceiver arrays can partially overlap.

During the execution of stage 210 at least one acoustic transceiver array of multiple acoustic transceiver arrays receives echoes of acoustic pulses that were transmitted by another acoustic transceiver array of the multiple acoustic transceiver arrays. Alternatively, each acoustic transceiver arrays received only echoes of acoustic pulses it transmitted.

Stage 210 may include transmitting by at least two of the multiple acoustic transceiver arrays, a plurality of acoustics pulses in an at least a partially overlapping manner towards an overlap area to generate an acoustic interference pattern that comprises multiple fringes; and detecting by at least one of the acoustic transceiver arrays a fringe of the acoustic interference pattern; providing a fringe detection signal; and processing the fringe detection signal to assist in a provision of the estimate related to the content.

Once for one or more iterations of stages 210, 220 and 230 the method can perform a timing calibration process—which is represented by synchronization stage 260. In order to accurately map the locations of the different acoustic detection devices when they transmitted the acoustic pulses (or when they received the echoes). The synchronization can also assist in better coordinate between the transmission of acoustic pulses by different acoustic detection devices.

The synchronization stage 260 can include synchronizing one or more clock of one or more acoustic detection device to a master clock. The master clock can be a clock of one of the acoustic detection devices or to the clock of another entity such as a computer that controls the acoustic detection devices.

A slave acoustic transceiver array that executes stage 260 may execute the following stages:
  a. Receiving (261) by the slave acoustic transceiver array multiple master clock time stamps.
  b. Determining (262) a compensated value of a slave clock time stamp (of a slave clock of the slave acoustic transceiver array) in response to values of the multiple master clock time stamps and timings of receiving of the multiple master clock time stamps by the slave acoustic transceiver array; and
  c. Setting (263) the slave clock to the compensated value.

The compensating may include calculating by the certain acoustic transceiver array a gap between a rate of the slave clock and a rate of the master clock in response to the multiple master clock time stamps and in response to the timings of the receiving of the multiple master clock stamps.

For a non-limiting example, the time gaps allowed between clocks of different acoustic transceiver arrays can be about five microseconds and the clock accuracy of each acoustic transceiver array may be about 100 ppm—i.e. up to 100 microseconds drift per second. One per few minutes a masker can broadcast master time stamps to all acoustic transceiver arrays. The transmission can be made by wire or wireless means. For example, it can be made using a RS485 multidrop protocol that connects all the acoustic detection devices.

Definitions

CM(t[n])—the master clock at time t[n] (n=0, 1, 2, . . . )
CS(t[n])—the salve clock at time t[n]
The slave correction to the master clock at time t[n] is given by:

$C1 = CM(t[n]) - CS(t[n])$

The slave estimation of its clock drift relatively to the Master clock is:

$C2 = ((CM(t[n]) - CS(t[n])) - (CM(t[n-1]) - CS(t[n-1])))/(t[n] - t[n-1])$

The slave clock compensation value (Executed at slave clock timestamp t'>t[n], assuming t[n] is the last received transmission from master prior to t[n]) will be given by:

$CM(t') \sim CS(t') + C1 + C2*(t' - t[n])$

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for evaluating a content of a bin, the method comprising:
   receiving, from a first acoustic detection device that comprises a first acoustic transceiver array and by a computer, multiple first estimates of different first areas of an upper surface of the content, the first estimates are calculated by the first acoustic detection device by processing first echoes of acoustic pulses; wherein the first acoustic transceiver array comprises transducers;
   wherein each first acoustic pulse has a shape of a lobe that is more than forty degrees wide;
   wherein the first echoes are received by the first acoustic transceiver array as a result of a transmitting of the acoustic pulses by the first acoustic transceiver array towards the different first areas of the upper surface of the content when the first acoustic transceiver array was positioned at different locations; wherein the first acoustic transceiver array is connected to a movable apparatus that moves the first acoustic transceiver array between the different locations of the first acoustic transceiver array;
   receiving, by the computer and from an acoustic based location device, first location information indicative of the different locations of the first acoustic transceiver array;
   generating, by the computer, an estimate related to the content in response to the multiple first estimates and to the first location information;
   transmitting by the first acoustic transceiver array and by a second acoustic transceiver array, a plurality of acoustics pulses in an at least a partially overlapping manner towards an overlap area to generate an acoustic interference pattern that comprises multiple fringes; wherein the second acoustic transceiver array comprises transducers;
   detecting by at least one of the first and second acoustic transceiver arrays a fringe of the acoustic interference pattern and providing a fringe detection signal; and
   wherein a distance between the first and second acoustic transceiver arrays is (a) at least ten times a distance between centers of the transducers of the second acoustic transceiver array; and (b) at least ten times a distance between centers of the transducers of the first acoustic transceiver array.

2. The method according to claim 1 wherein a distance between adjacent locations of the first acoustic transceiver array is at least ten times a distance between centers of the transducers of the first acoustic transceiver array.

3. The method according to claim 1 wherein each first estimate is associated with a first acoustic transceiver array time stamp; wherein the first location information comprises a mapping between locations of the first acoustic transceiver array and a master clock time stamps; and wherein the method comprises calculating the locations of the first acoustic transceiver array in response to the first acoustic time stamps, the mapping and a timing relationship between the first acoustic detection device clock and the master clock.

4. The method according to claim 3 comprising compensating for clock differences between first acoustic detection device clock and the master clock.

5. The method according to claim 4 wherein the compensating comprises: receiving multiple master clock time stamps; determining a compensated value of a first acoustic detection device clock time stamp in response to values of the multiple master clock time stamps and timings of receiving of the multiple master clock time stamps; and setting the first acoustic detection device clock to the compensated value.

6. The method according to claim 5 wherein the compensating comprises calculating by the first acoustic detection device a gap between a rate of the first acoustic detection device clock and a rate of the master clock in response to the multiple master clock time stamps and in response to the timings of the receiving of the multiple master clock time stamps.

7. The method according to claim 1 wherein the acoustic based location device comprises a first and second ranging acoustic transceiver arrays that face each other, wherein the first ranging acoustic transceiver array is static and the second ranging acoustic transceiver array follows a movement of the first acoustic transceiver array; wherein the method comprises calculating a distance between the first and second ranging acoustic transceiver arrays based on a propagation period of an acoustic pulse between the first and second ranging acoustic transceiver arrays.

8. The method according to claim 1 wherein the acoustic based location device comprises three ranging acoustic transceiver arrays that face each other, wherein at least one of the three ranging acoustic transceiver array is static and wherein at least another of the three ranging acoustic transceiver arrays follows a movement of the first acoustic transceiver array.

9. The method according to claim 1 wherein an upper surface of the content is expected to be located within a far field of each acoustic transceiver of the first acoustic transceiver array during the transmitting of the acoustic pulses by the first acoustic transceiver array.

10. The method according to claim 1 comprising:
transmitting, by the first acoustic transceiver array, the acoustic pulses;
receiving, by the first acoustic transceiver array, the echoes of the acoustic pulses; and
processing, by the first acoustic detection device, the echoes of the acoustic pulses to provide the first estimates.

11. The method according to claim 1 wherein the processing the first echoes of acoustic pulses comprises utilizing a fuzzy logic engine.

12. The method according to claim 1 wherein the movable apparatus moves along a linear path at a constant velocity.

13. The method according to claim 1 comprising:
receiving, from a second acoustic detection device that comprises the second acoustic transceiver array, multiple second estimates of different second areas of the upper surface of the content, the second estimates are taken when the second acoustic transceiver is positioned at different locations of the second acoustic transceiver array; wherein each second estimate is calculated by the second acoustic detection device by processing second echoes of acoustic pulses; wherein each second acoustic pulse has a shape of a lobe that is more that forty degrees wide; wherein the second acoustic transceiver array is connected to the movable apparatus, wherein the movable apparatus moves the second acoustic transceiver array between the different locations of the second acoustic transceiver array;
receiving, from the acoustic based location device, second location information indicative of a location of the different locations of the second acoustic transceiver array; and
generating, by the computer, the estimate related to the content in response to the multiple first estimates, the multiple second estimates, the first location information and the second location information.

14. The method according to claim 13 wherein at least one first area partially overlaps at least one second area.

15. The method according to claim 13 comprising:
transmitting, by the first and second acoustic transceiver arrays, the acoustic pulses;
receiving, by the first and second acoustic transceiver arrays, first and second echoes of the acoustic pulses; wherein at least one acoustic transceiver array of the first and second acoustic transceiver arrays receives echoes of acoustic pulses that were transmitted by another acoustic transceiver array of the first and second acoustic transceiver arrays;
processing, by the first and second acoustic detection devices, the first and second echoes of the acoustic pulses to provide the first and second estimates.

16. The method according to claim 1 wherein the transmitting of the acoustic pulses by the first acoustic transceiver array is executed without changing a direction of the transmitting of the acoustic pulses.

17. The method according to claim 13 wherein the acoustic based location device comprises first and second ranging acoustic transceiver arrays that face each other, wherein the first ranging acoustic transceiver array is static and the second ranging acoustic transceiver array follows a movement of the first acoustic transceiver array; and wherein the second ranging acoustic transceiver array is positioned between the first acoustic transceiver array and the second acoustic transceiver array.

18. The method according to claim 17 wherein the first and second ranging acoustic transceiver arrays use different transmission frequencies than transmission frequencies used by the first and second acoustic transceiver arrays.

19. The method according to claim 17 wherein the first and second ranging acoustic transceiver arrays use different transmission windows than transmission windows used by the first and second acoustic transceiver arrays.

20. The method according to claim 1 wherein the acoustic based location device comprises a first and second ranging acoustic transceiver arrays that face each other and are orthogonal to the first acoustic transceiver array.

21. The method according to claim 1 wherein the first acoustic transceiver comprises acoustic transceivers that are parallel to each other, are positioned in a same plane and have parallel fields of view.

22. The method according to claim 7 wherein the first and second ranging acoustic transceiver arrays use different transmission frequencies than transmission frequencies used by the first acoustic transceiver array.

* * * * *